United States Patent [19]

Blunt

[11] 4,408,019

[45] Oct. 4, 1983

[54] BLOCK COPOLYMERS OF ETHYLENE AND PROPYLENE

[75] Inventor: Harry W. Blunt, Hockessin, Del.

[73] Assignee: Hercules Incorporated, Wilmington, Del.

[21] Appl. No.: 272,452

[22] Filed: Jun. 11, 1981

[51] Int. Cl.³ .......................................... C08F 297/08
[52] U.S. Cl. .................................. 525/323; 525/268; 526/118; 526/351
[58] Field of Search .............................. 525/323, 268

[56] References Cited

U.S. PATENT DOCUMENTS 3,349,018 10/1967 Potts .................................... 525/323
3,478,130 11/1969 Hosteller ............................. 525/323
3,480,696 11/1969 Hassell et al. ....................... 525/323

*Primary Examiner*—Edward J. Smith
*Attorney, Agent, or Firm*—George H. Hopkins

[57] ABSTRACT

Thermoplastic elastomeric block copolymers having the general formula $(AB)_nA$, wherein each A is a crystalline polypropylene block, each B is a random ethylene-propylene copolymer block and n is an integer from 1 to about 12 exhibit structural and physical properties differences in comparison to related products.

4 Claims, No Drawings

BLOCK COPOLYMERS OF ETHYLENE AND PROPYLENE

This invention relates to new block copolymers of ethylene and propylene. More particularly, it relates to novel block copolymers of ethylene and propylene which are thermoplastic elastomers.

Many so-called ethylene-propylene block copolymers have been disclosed in the art. However, the formation of a true block copolymer based on ethylene and propylene as the monomers is dependent upon there being no permanent interruption in the growth of any given polymer chain until all of the desired polymer blocks have been completed. A polymer chain capable of living on and on until purposely terminated is therefore necessary in order to form a true block copolymer of ethylene and propylene.

Moreover, the formation of a living 60-olefin polymer chain having a maximum lifetime is completely dependent upon the utilization of a catalyst system consisting essentially of components which will not induce chain termination. The composition of such a system is not predictable, as is evidenced by the fact that other systems, for example, the more traditional Ziegler-Natta catalyst systems based on titanium halides in conjunction with alkylaluminums, alkylaluminum hydrides or alkylaluminum halides, do not provide chain lifetimes of sufficient duration to permit the formation of block copolymers containing any more than two polymer blocks. Such copolymers are ordinarily designated as being AB block copolymers and are ordinarily found in only minor amounts in the total polymer product.

Now in accordance with this invention, the discovery has been made of a novel class of thermoplastic elastomers which are block copolymers of ethylene and propylene having the general formula $(AB)_nA$, wherein each A is a crystalline polypropylene block having an intrinsic viscosity in the range of from about 0.25 to about 1.6 dl./gm., each B block is a random ethylene-propylene copolymer block having an intrinsic viscosity in the range of from about 3.0 to about 7.0 dl./gm., said intrinsic viscosities being measured in decahydronaphthalene at 135° C., and n is an integer from 1 to about 12. The ethylene-propylene copolymer block is further characterized by containing from about 5 to about 15% by weight, based on the total monomer content in the block copolymer product, of crystalline polyethylene segments and by showing two principal absorbences in the infrared wave length region between about 12.8 and about 14.5 microns.

The block copolymers of this invention are prepared by a polymerization process which is based on the utilization of a catalyst-activator system in which titanium is the sole metal component. More specifically, the process utilizes titanium trichloride as the catalyst component and dimethylbis(methylcyclopentadienyl)titanium as the activator component in the polymerization reaction.

Relative to the activator component of the above process, an analogue thereof, namely, dimethylbis(cyclopentadienyl)titanium, and its use with titanium trichloride to effect the polymerization of propylene are disclosed in U.S. Pat. No. 2,992,212 to deButts. However, although not disclosed by the deButts patent, dimethylbis(cyclopentadienyl)titanium is thermally unstable, the solid compound decomposing rapidly at room temperature in the presence of ordinary light. In solution in ether, the compound can be handled for several hours at 25° C., but, in solution in a hydrocarbon solvent, the compound decomposes nearly as readily as it does in the solid state. Confirming the instability of this compound is the disclosure in U.S. Pat. No. 3,104,249 to Clauss et al (column 4, lines 52–53) that the compound was stored at the temperature of solid carbon dioxide (−79° C.) and in the absence of light. This instability of dimethylbis(cyclopentadienyl)titanium also necessitates preparation of the compound at a low temperature, preferably between about −10° and −30° C.

Therefore, when dimethylbis(cyclopentadienyl)titanium is used to activate the polymerization of propylene in accordance with the deButts patent, solutions of the compound should be used promptly and the temperature of polymerization should be held to a maximum of 30° C. in order to avoid undue decomposition of the compound and a corresponding decrease in the rate of polymerization. Moreover, although a mole ratio of dimethylbis(cyclopentadienyl)titanium to titanium trichloride of 0.5:1 will provide a maximum rate of polymerization of propylene at 30° C., a ratio of 3:1 is necessary at this temperature to provide maximum lifetimes of the propylene polymer chains.

On the other hand, the dimethylbis(methylcyclopentadienyl)titanium compound to which reference has been made earlier exhibits an unexpected degree of greater stability than the compound of the deButts patent and is eminently suitable as an activator for titanium trichloride in the polymerization reaction involved in the preparation of the block copolymers of this invention. With regard to its stability, dimethylbis(methylcyclopentadienyl)titanium may be dried and stored at room temperature under inert conditions for twenty-four hours, including ten hours under direct fluorescent light, without any visible change taking place. The stored compound is as effective as an activator for titanium trichloride as is the freshly dried compound. The compound is also comparably stable and effective after storage for seventy-five days in the absence of light.

Most of the following examples are descriptive of the preparation and properties of the novel block copolymers of this invention. However, the first two examples are included for the purpose of showing the preparation of the particular activator used in preparing these copolymers and to provide evidence of the long-lived olefin polymer chains obtainable with this activator in combination with titanium trichloride. All amounts of reactants and reagents are as given in the examples. In Examples 2 to 8, the intrinsic viscosity values given therein were all determined by measurements in decahydronaphthalene at 135° C.

EXAMPLE 1

Dimethylbis(methylcyclopentadienyl)titanium was prepared by the reaction of dichlorobis(methylcyclopentadienyl)titanium (IV) [(MeCp)$_2$TiCl$_2$] with methylmagnesium chloride [MeMgCl] under anhydrous conditions. (MeCp)$_2$TiCl$_2$ (27.1 g., 97.7 mmole) was placed in a 28-ounce crown cap bottle with a stirring bar. After capping, the bottle and its contents were purged with argon for about 30 minutes. Argon purged, anhydrous diethyl ether was added to bring the volume to 400 ml. After cooling the bottle's contents to 0° C., an ether solution of MeMgCl (120 ml., 1.98 M, 238 mmole) was added over a 10-minute period to the vigorously stirred solution of (MeCp)$_2$TiCl$_2$ in ether. Stirring at 0° C. was continued and then the temperature was allowed to rise to room temperature. After stirring overnight, the crude ether solution was separated by centrifugation from the MgCl$_2$ formed in the reaction and combined with ether washings of the MgCl$_2$.

The combined ether solution containing the (MeCp)$_2$TiMe$_2$ reaction product was then extracted twice with two 150-ml. portions of argon-purged distilled water at 25° C. and subsequently dried by passing it over a 15 mm.×400 mm. column of 4A molecular sieves. The ether was stripped from the reaction product by vacuum distillation, 100 ml. of hexane was added, and the ensuing solution was reduced to 50 ml. under vacuum. Three hundred milliliters of hexane was added and the solution was dried again over 4A molecular sieves. The concentration of the dried 295 ml. of solution was determined to be 0.246 M in (MeCp)$_2$TiMe$_2$. Product yield was 74%. A typical analysis of the product produced according to this example showed: Ti, 19.7%; C, 70.64%; H, 10.14%. The corresponding theoretical values are: Ti, 20.28%; C, 71.19%; H, 8.53%. An nmr spectrum of (MeCp)$_2$TiMe$_2$ (60 MHz, 35° C., CCl$_4$ solution, internal reference of tetramethylsilane) exhibits two singlets of equal intensity at −0.37 ppm attributed to the Ti-methyl protons and at 2.15 ppm attributed to the ring-methyl protons. A multiplet centered at 5.72 ppm is characteristic of the cyclopentadienyl ring protons. An ultraviolet spectrum indicates λmax=223 nm, ε=30,500 liter/cm-mole.

EXAMPLE 2

Dimethylbis(methylcyclopentadienyl)titanium prepared according to Example 1 was used as the activator in the polymerization of propylene. Six eight-ounce crown cap bottles containing an argon atmosphere were charged with 100 ml. of argon-purged hexane free of water and unsaturated impurities. To each bottle was added 0.19 mmole of (MeCp)$_2$TiMe$_2$, and propylene was admitted at a partial pressure of 2.0 p.s.i. Each bottle was equilibrated with stirring at 45° C. To each bottle was then added 0.25 mmole of TiCl$_3$, and stirring was continued at 45° C. The polymerizations in the several bottles were quenched at a variety of times by addition of 5.0 ml. of butanol containing 0.2% of water. The polymers were separated from their respective slurries, washed once with a 50:50 mixture of methanol and isopropanol and twice more with acetone. After drying, the intrinsic viscosities of the polymers were obtained. Viscosity average molecular weights, M$_v$, were calculated according to the Mark-Houwink relationship:

$$[\eta] = 1.62 \times 10^{-4} M_v^{0.769}$$

The moles of polymer per mmole of TiCl$_3$ were calculated assuming the number average molecular weight, M$_n$, was equal to 0.25 M$_v$. Results are listed in Table 1. The very slow rate of change in the number of moles of polymer with time indicates long-lived polymer chains; in this example, the average kinetic chain lifetime exceeds 12 hours.

TABLE 1

Homopolymerization of Propylene Catalyzed by TiCl$_3$ and Activated with (MeCp)$_2$TiMe$_2$

| Time (min.) | Yield (gms/ mmole TiCl$_3$) | IV (dl./gm.) | M̄$_v$ (gms/mole) (× 10$^{-5}$) | moles Polymer mmole TiCl$_3$ (× 10$^6$) |
|---|---|---|---|---|
| 5 | 0.2612 | 0.61 | 0.445 | 23.5 |
| 10 | 0.5504 | 1.04 | 0.891 | 24.7 |
| 42 | 1.6856 | 2.20 | 2.36 | 28.6 |
| 50 | 1.9744 | 2.58 | 2.90 | 27.2 |
| 90 | 2.6976 | 3.33 | 4.04 | 26.7 |
| 180 | 4.4392 | 4.58 | 6.12 | 29.0 |

EXAMPLE 3

Dimethylbis(methylcyclopentadienyl)titanium prepared according to Example 1 was used as the activator in the preparation of an ABA block copolymer of ethylene and propylene. A one-gallon polymerization vessel was charged with two liters of nitrogen-purged pentane free of water and unsaturated impurities. The pentane was heated to 45° C. with stirring and the vessel was vented to a pressure equal to that of the vapor pressure of pentane at 45° C. To the vessel was added five mmoles of (MeCp)$_2$TiMe$_2$, and propylene was then added at a partial pressure of 178 mm. of Hg. Polymerization was begun with the addition of ten mmoles of TiCl$_3$. When 56 mm. of Hg of propylene had been consumed, at which point an intrinsic viscosity of 0.7 dl./gm. was indicated, ethylene was added to bring the monomer partial pressure to 180 mm. of Hg, and the feeding of a 65:35 by volume ethylene:propylene mixture was begun at a rate sufficient to maintain the monomer pressure at 180 mm. of Hg. After 22.2 liters of the mixture had been consumed, the monomer feed was shut off and the reactor was vented down to the vapor pressure of pentane at 45° C. The intrinsic viscosity of the ethylene-propylene copolymer block now existing at this stage of the polymerization was indicated to be 3.5 dl./gm. A volume of 2.4 liters of propylene was then fed to the reactor and the reactor pressure was allowed to drop again to that of the vapor pressure of pentane at 45° C. as the propylene was consumed. The polymerization slurry was drained from the reactor into one liter of methanol and the resulting mixture was refluxed for 90 minutes. The polymer was filtered, washed several times with methanol, and dried. The polymer product amounted to 34.5 gm. and had an intrinsic viscosity of 4.47 dl./gm. Differential thermal analysis indicated 21.3 weight percent of high melting polypropylene in the copolymer product. X-ray diffraction indicated 13.7 weight percent of crystalline polypropylene and 12.5 weight percent of crystalline polyethylene. Infrared spectroscopy showed two principal absorbences, one due to the random copolymer and the other due to the crystalline polyethylene in the random copolymer block, in the wave length region between 13.0 and 14.3 microns, and also determined that the product contained 40.7 weight percent of ethylene. A compression-molded sample of the copolymer had a Shore A hardness of 83 at 23° C. and 73 at 70° C., a compression set of 48% at 70° C. and a tensile strength of 2380 p.s.i.

EXAMPLE 4

With appropriate modifications, the general procedure of Example 3 was followed in preparing an ABA block copolymer at a polymerization temperature of 0° C. A one-gallon polymerization vessel was charged with two liters of nitrogen-purged hexane free of water and unsaturated impurities. The hexane was cooled to 0° C. with stirring and the vessel was equilibrated at 0° C. with a pressure equal to one atmosphere comprised of nitrogen and hexane vapor. To the vessel was added six mmoles of $(MeCp)_2TiMe_2$, and propylene was then added at a partial pressure of 148 mm. of Hg. Polymerization was begun with the addition of 12.0 mmoles of $TiCl_3$. When 22 mm. of Hg of propylene had been consumed, ethylene was added to bring the monomer partial pressure to 190 mm. of Hg, and the feeding of a 65:35 by volume ethylene:propylene mixture was begun at a rate sufficient to maintain the monomer pressure at 190 mm. of Hg. After 22.2 liters of the mixture had been consumed, the monomer feed was shut off and the reactor pressure was allowed to drop to 128 mm. of Hg as the monomer was consumed. A volume of 26.25 liters of propylene was then fed to the reactor and the reactor pressure was allowed to drop to 348 mm. of Hg as propylene was consumed. The polymerization slurry was drained from the reactor into one liter of distilled methanol and the resulting mixture was refluxed for one hour. The polymer was filtered, washed with methanol, and dried. The polymer product amounted to 32.0 gm. of hexane-insoluble polymer and four grams of hexane-soluble material. The hexane-insoluble polymer had an intrinsic viscosity of 6.8 dl./gm., and X-ray diffraction indicated 14.0 weight percent of crystalline polypropylene and 10.1 weight percent of crystalline polyethylene. Infrared spectroscopy showed two principal absorbences, as in Example 3, and determined that the hexane-insoluble material contained 49.6 weight percent of ethylene, and a compression-molded sample had a Shore A hardness of 73 at 70° C., a compression set of 41% at 70° C. and a tensile strength of 3000 p.s.i.

EXAMPLE 5

Using hexane as the solvent, the procedure of Example 3 was followed in the preparation of an $(AB)_2A$ block copolymer of ethylene and propylene. The initial amount of propylene charged was 5.8 liters (1 atm., 23° C.). After reaction to a monomer partial pressure of 131 mm. of Hg, one gram of a polypropylene A block having an indicated intrinsic viscosity of 0.25 dl./gm. was obtained. Then 777 milliliters (1 atm., 23° C.) of ethylene was rapidly added, followed by the 63:35 by volume ethylene:propylene mixture at a rate sufficient to maintain a monomer pressure of 190 mm. of Hg. After the consumption of 22.2 liters of this mixture, there was obtained 71.2 grams of an ethylene-propylene copolymer B block having an indicated intrinsic viscosity of 7.0 dl./gm. After venting the reactor to the vapor pressure of hexane at 45° C. and charging with 12.2 liters of propylene, the preparation of an additional A block and an additional B block was carried out as described above. The A block amounted to 12.0 grams having an indicated intrinsic viscosity of 1.6 dl./gm., and the B block amounted to 71.2 grams having an indicated intrinsic viscosity of 7.0 dl./gm. After venting the reactor to the vapor pressure of hexane at 45° C. and charging with 582 milliliters of propylene, the polymerization was continued to the vapor pressure of hexane at 45° C. to form the final A block in the amount of one gram and having an indicated intrinsic viscosity of 0.25 dl./gm.

EXAMPLE 6

Following generally the procedure of Example 3, but using hexane as the solvent, ten mmoles of the activator and 18 mmoles of $TiCl_3$, an ABA block copolymer was prepared by feeding to the reactor an initial charge of propylene amounting to 4.9 grams, followed by a 50:50 by weight ethylene:propylene mixture amounting to 28.6 grams and then a final charge of propylene amounting to 4.9 grams. The recovered polymer was obtained in a 97% yield based on the amount of monomers fed to the reactor. X-ray diffraction indicated the presence of 27.0 weight percent of crystalline polypropylene and four weight percent of crystalline polyethylene. A compression-molded sample of the copolymer had a Shore A hardness of 87 at 23° C. and a tensile strength of 3000 p.s.i.

EXAMPLE 7

This example shows the preparation of an $(AB)_5A$ copolymer of ethylene and propylene. A one-gallon polymerization vessel containing a nitrogen atmosphere was charged with two liters of nitrogen-purged pentane free of water and unsaturated impurities. The pentane was heated with stirring to 45° C. and the vessel was vented to a pressure equal to that of the vapor pressure of pentane at 45° C. (hereafter referred to as $P_o$). To the vessel was added five mmoles of $(MeCp)_2TiMe_2$. Propylene was added to saturate the pentane at a partial pressure of 185 mm. of Hg. Polymerization began with the addition of ten mmoles of $TiCl_3$ and continued as monomer was consumed until the propylene pressure was down to 124 mm. of Hg., at which point an intrinsic viscosity of 0.7 dl./gm. was indicated. At that time, ethylene was rapidly added to bring the monomer partial pressure to 188 mm. of Hg and the feeding of a 65:35 by volume ethylene:propylene mixture was begun at a rate sufficient to maintain the monomer pressure at 188 mm. of Hg. After 22.2 liters of the mixture had been fed, the monomer feeds were shut off and the reactor was vented down to $P_o$. The intrinsic viscosity of the ethylene-propylene copolymer block now existing at this stage of the polymerization was indicated to be 3.5 dl./gm. Propylene was added to a partial pressure of 246 mm. of Hg and was then allowed to react down to 134 mm. of HG The intrinsic viscosity of this polypropylene block was indicated to be 1.2 dl./gm. Ethylene was rapidly added to bring the monomer partial pressure to 190 mm. of Hg and the feeding of a 65:35 ethylene:propylene by volume mixture was begun at a rate sufficient to maintain the monomer pressure at 190 mm. of Hg. After 22.2 liters of the mixture had been fed, the monomer feeds were shut off and the reactor was vented down to $P_o$. Propylene was added to a partial pressure of 246 mm. of Hg and was then allowed to react down to 134 mm. of Hg. Ethylene was rapidly added to bring the monomer partial pressure to 190 mm. of Hg and the feeding of a 65:35 by volume ethylene:-propylene mixture was begun at a rate sufficient to maintain the monomer pressure at 190 mm. of Hg. After 22.2 liters of the mixture had been fed, the monomer feeds were shut off and the reactor was vented to $P_o$. Propylene was added to a partial pressure of 246 mm. of Hg and was then allowed to react down to 134 mm. of Hg. Ethylene was rapidly added to bring the monomer partial pressure to 190 mm. of Hg and the feeding of a 65:35 by volume ethylene:propylene mixture was begun at a rate sufficient to maintain the monomer partial pressure at 190 mm. of Hg. After 22.2 liters of the mixture had been fed, the monomer feeds were shut off and the reactor was vented to $P_o$. Propylene was added to a partial pressure of 246 mm. of Hg and was then allowed to react down to 134 mm. of Hg. Ethylene was rapidly added to bring the monomer partial pressure to 190 mm. of Hg and the feeding of a 65:35 by volume ethylene:propylene mixture was begun at a rate sufficient to maintain the monomer partial pressure at 190 mm. of Hg. After 22.2 liters of the mixture had been fed, the monomer feeds were shut off and the reactor was vented to $P_o$. Two and four-tenths liters of propylene was added over an interval of 2.85 minutes. The reactor pressure dropped to $P_o$ in 29.5 minutes as the propylene was consumed. At this point, an intrinsic viscosity of 0.7 dl./gm. for this polypropylene block was indicated. The slurry was drained from the reactor into one liter of dry methanol and the mixture was refluxed for 90 minutes. The polymer was filtered, washed with a total of six liters of methanol, and dried.

The polymer product amounted to 179 gm. and had an intrinsic viscosity of 11.8 dl./gm. Differential thermal analysis indicated 20.6 weight percent of high melting polypropylene. X-ray diffraction indicated 16.3 weight percent of crystalline polypropylene and 8.6 weight percent of crystalline polyethylene. Infrared spectroscopy determined that the material contained 40.9 weight percent of ethylene. A compression-molded sample of the copolymer had a Shore A hardness of 83 at 23° C. and 73 at 70° C.

EXAMPLE 8

Using the procedure of Example 7, an $(AB)_{11}A$ block copolymer of ethylene and propylene was prepared. The polymer product amounted to 4686 gm. and had an intrinsic viscosity of 14.2 dl./gm. Differential thermal analysis indicated 13.0 weight percent of high melting polypropylene. X-ray diffraction indicated 15.2 weight percent of crystalline polypropylene and 11.3 weight percent of crystalline polyethylene. Infrared spectroscopy determined that the material contained 38.4 weight percent of ethylene.

As shown in Example 1, dimethylbis(methylcyclopentadienyl)titanium may be prepared by the reaction of dichlorobis(methylcyclopentadienyl)titanium with methylmagnesium chloride in solution in diethyl ether. Alternatively, methylmagnesium bromide or methyllithium may be used as the alkylating agent. Due to the enhanced stability of the $(MeCp)_2TiMe_2$ product in comparison to $Cp_2TiMe_2$, this reaction may advantageously be carried out at room temperature. More generally, however, the reaction temperature may range from about $-30°$ C. to about 30° C., preferably from about 0° C. to about 20° C., with temperatures in the neighborhood of 0° C. being particularly preferred. Subsequent to the reaction, the metal halide by-product is separated from the ether solution containing the $(MeCp)_2TiMe_2$, and the latter component is recovered by conventional techniques. In the case of a magnesium halide by-product, it is important to include an aqueous extraction of the ether solution to reduce the magnesium level in the $(MeCp)_2TiMe_2$ product to the point where it does not interfere with the effectiveness of $(MeCp)_2TiMe_2$ as an activator for the titanium trichloride catalyst. A magnesium level less than about 0.01% is satisfactory.

In the block copolymerization of ethylene and propylene, the $(MeCp)_2TiMe_2$ activator should be used with a $TiCl_3$ catalyst component which is free or essentially free of aluminum. Otherwise, the advantage of long chain lifetime is not achieved. The amount of aluminum per titanium on a molar basis should be no more than about 0.10 and is preferably no more than about 0.07. Even more preferably, the amount of aluminum per titanium on a molar basis is no more than about 0.04. A suitable $TiCl_3$ catalyst component, containing no aluminum, may be prepared by the reduction of $TiCl_4$ with hydrogen. Also suitable is the catalyst component obtained by extensive hydrocarbon washing of the isolated catalyst complex prepared in accordance with Belgian Pat. No. 780,758 to Solvay & Cie by the process of reducing $TiCl_4$ by means of an organoaluminum reducing agent which is preferably diethylaluminum chloride, treating the reduced solid thus obtained with a complexing agent such as an aliphatic ether, effecting reaction of the complexed reduced solid with $TiCl_4$, and isolating the catalyst complex thus formed. The $TiCl_3$ catalyst so obtained is essentially free of aluminum, has a high surface area and is highly active. The amount of $(MeCp)_2TiMe_2$ which may be used to activate the $TiCl_3$ catalyst is such as to provide a $(MeCp)_2TiMe_2$ to $TiCl_3$ mole ratio in the range of from about 0.06:1 to about 3:1. However, the preferred mole ratio is in the range of from about 0.5:1 to about 0.75:1, since such ratios provide both optimum rates of polymerization and maximum chain lifetimes.

The polymerizations may be carried out at temperatures in the range of from about 20° C. to about 100° C., preferably from about 25° C. to about 60° C. Lower rates of polymerization are observed with the lower temperatures in these ranges, and a tendency for slightly shorter chain lifetimes parallels increasing temperatures. The best balance between rate and chain lifetime is obtained at a temperature of about 45° C. The monomer partial pressures during polymerization may be from about two to about 25 p.s.i. For the preparation of block copolymers with well-defined blocks, a reasonably low rate of polymerization and, thus, a comparatively low pressure, are desired, since it is possible to change the composition of the monomer mixture in solution more rapidly in relation to the rate of polymerization than when higher pressures are used. A pressure of about three to five p.s.i. has been found to be convenient in the preparation of the block copolymers of this invention.

Moreover, as discussed earlier, the polymerizations require the formation of living polymer chains which, in the present case, are obviously the result of using $(MeCp)_2TiMe_2$ as the activator compound. It is clear that it is this compound, and not the titanium trichloride catalyst, which enables the block copolymerization of ethylene and propylene with significantly longer chain lifetimes than those found in the more usual aluminum-activated Ziegler-Natta polymerizations, which also use titanium trichloride as a catalyst component. As a matter of fact, the polymerizations in accordance with this invention may be interrupted by removal of the monomer(s) and left under an inert atmosphere for hours, after which polymerization can be resumed, with no change in the number of polymer chains, simply by reintroducing the monomer(s) feed. These characteristics of the instant process obviously render it admirably suitable for the preparation of the block copolymers of this invention.

Basically, the novel block copolymers of this invention are thermoplastic elastomers having the general formula $(AB)_nA$, wherein each A is a crystalline polypropylene block, each B is a random ethylene-propylene copolymer block and n is an integer from 1 to about 12. However, more specifically, the block copolymers of the above formula contain from about 10 to about 40% by weight, based on the block copolymer product, of crystalline polypropylene blocks having intrinsic viscosities, as measured in decahydronaphthalene at 135° C., in the range of from about 0.25 to about 1.6 dl./gm., preferably from about 0.35 to about 1.1 dl./gm., and from about 60 to about 90% by weight, based on the block copolymer product, of elastomeric ethylene-propylene copolymer block(s) having intrinsic viscosities in the range of from about 3.0 to about 7.0 dl./gm., preferably from about 4.5 to about 5.6 dl./gm.

Moreover, the amount of ethylene in the elastomeric copolymer block is typically in the range of from about 40 to about 65% by weight based on the total monomer content in the block copolymer product. Of this amount of ethylene, from about 5 to about 15% by weight, based on the total monomer content in the block copolymer product, is in the form of crystalline polyethylene segments. These crystalline polyethylene segments were unexpected, but apparently are formed as a result of the highly stereospecific catalyst system used in the process and the presence of at least 50 mole % of ethylene in the elastomeric copolymer block. As a consequence, the elastomeric copolymer block B shows two principal absorbences in the infrared wave length region between about 12.8 and about 14.5 microns.

The thermoplastic elastomeric block copolymer products produced by the process of this invention have distinctly improved physical properties in comparison to related known products. For example, the instant products are higher in tensile strength than commercial products which are physical mixtures of polypropylene and ethylene-propylene rubbers. They are also higher in tensile strength than the ABA block copolymers of, for example, U.S. Pat. No. 3,480,696 to Shell Oil and are further improved over the Shell copolymers in exhibiting less compression set.

This improvement in compression set was also unexpected. Although it was recognized, after discovering the presence of the unexpected crystalline polyethylene segments in the instant products, that this significant structural difference from prior art products might well have an effect on the physical properties of the present products, there was no basis for predicting which property, if any, might be affected. More specifically, it was unpredictable that compression set would be an improved property, particularly in view of the disclosure in the Shell patent that the presence of polyethylene segments in an ethylene-propylene copolymer would render the latter less elastomeric. In any event, the process of this invention provides improved block copolymer products derived from ethylene and propylene and useful in applications such as wire coating, hose and tubing, footwear and adhesives.

What I claim and desire to protect by Letters Patent is:

1. As a new copolymer product, a thermoplastic elastomeric block copolymer having the general formula $(AB)_nA$ wherein each A is a crystalline polypropylene block having an intrinsic viscosity in the range of from about 0.25 to about 1.6 dl./gm., each B is a random ethylene-propylene copolymer block having an intrinsic viscosity in the range of from about 3.0 to about 7.0 dl./gm., said intrinsic viscosities being measured in decahydronaphthalene at 135° C., and n is an integer from 1 to about 12, said ethylene-propylene copolymer block being further characterized by containing from about 5 to about 15% by weight, based on the total monomer content in the block copolymer product, of crystalline polyethylene segments and by showing two principal absorbences in the infrared wave length region between about 12.8 and about 14.5 microns.

2. The block copolymer of claim 1 wherein the A blocks constitute from about 10 to about 40% by weight and the B block(s) constitute from about 60 to about 90% by weight based on the block copolymer product.

3. The block copolymer of claim 2 wherein the B block(s) contain from about 40 to about 65% by weight of ethylene based on the total monomer content of the block copolymer product.

4. The block copolymer of claim 3 wherein the A blocks have an intrinsic viscosity in the range of from about 0.35 to about 1.1 dl./gm. and the B block(s) have an intrinsic viscosity in the range of from about 4.5 to about 5.6 dl./gm.

* * * * *